(12) United States Patent
Rehder et al.

(10) Patent No.: US 10,396,516 B2
(45) Date of Patent: Aug. 27, 2019

(54) SLIPRING WITH INTEGRATED HEATING UNIT

(71) Applicant: Schleifring GmbH, Fürstenfeldbruck (DE)

(72) Inventors: Jan Rehder, München (DE); Peter Heinbuch, Fürstenfeldbruck (DE); Albert Kirzdörfer, Fürstenfeldbruck (DE)

(73) Assignee: SCHLEIFRING GMBH, Fürstenfeldbruck (DE)

( * ) Notice: Subject to any disclaimer, the term of this patent is extended or adjusted under 35 U.S.C. 154(b) by 98 days.

(21) Appl. No.: 13/960,061

(22) Filed: Aug. 6, 2013

(65) Prior Publication Data

US 2014/0038433 A1    Feb. 6, 2014

(30) Foreign Application Priority Data

Aug. 6, 2012  (EP) .................................. 12179434

(51) Int. Cl.
| | | |
|---|---|---|
| *H01R 39/64* | (2006.01) | |
| *H01R 13/66* | (2006.01) | |
| *H01R 39/08* | (2006.01) | |
| *H02K 9/28* | (2006.01) | |
| *H01R 39/58* | (2006.01) | |

(52) U.S. Cl.
CPC ............ *H01R 39/64* (2013.01); *H01R 13/66* (2013.01); *H01R 39/08* (2013.01); *H02K 9/28* (2013.01); *H01R 39/58* (2013.01)

(58) Field of Classification Search
CPC ......... H01R 39/08; H01R 13/66; H01R 39/58

USPC ............... 219/471, 469, 494, 497, 501, 201; 439/15, 18; 392/394, 402
See application file for complete search history.

(56) References Cited

U.S. PATENT DOCUMENTS

| | | | | |
|---|---|---|---|---|
| 3,637,984 A | * | 1/1972 | Irvine ........................... | 219/471 |
| 3,957,330 A | | 5/1976 | Roscoe et al. ..................... | 439/5 |
| 4,650,964 A | * | 3/1987 | Vincent .................. | G01N 30/30 |
| | | | | 219/390 |
| 4,849,586 A | * | 7/1989 | Ida et al. .................... | 200/61.54 |
| 6,122,479 A | * | 9/2000 | Fujita ................. | G03G 15/2053 |
| | | | | 219/216 |
| 2010/0050467 A1 | * | 3/2010 | Lee ................................. | 34/499 |

FOREIGN PATENT DOCUMENTS

| | | |
|---|---|---|
| DE | 10360548 | 7/2005 |
| EP | 0662736 | 3/1994 |
| GB | 2461533 | 1/2010 |

* cited by examiner

*Primary Examiner* — Phuong T Nguyen
(74) *Attorney, Agent, or Firm* — Norton Rose Fulbright US LLP

(57) ABSTRACT

A slipring assembly comprises a slipring module having at least one slipring track which is in electrical contact with at least one slipring brush. The slipring module includes an isolating body holding the at least one slipring track. Furthermore a heating element is embedded in the slipring module to generate heat within the slipring module and to increase the temperature of the at least one slipring track. This allows increasing the temperature of the slipring module to an optimum operation temperature and further to remove humidity from the surface of the slipring track.

20 Claims, 7 Drawing Sheets

SLIPRING WITH INTEGRATED HEATING UNIT

PRIORITY CLAIM

This application claims priority to pending European Patent Application No. 12179434.1 filed on 6 Aug. 2012.

BACKGROUND OF THE INVENTION

1. Field of the Invention

The invention relates to an electrical power transfer device like a slipring or rotary joint. Sliprings are used to transfer electrical power between rotating parts of machines like wind power plants, CT scanners or electrical generators. There a brush, mainly including of electrically conductive material like a metal or carbon is sliding on a rotating cylindrical track of conductive material. Common materials for such tracks are steel or brass, sometimes being gold or silver-plated.

2. Description of Related Art

In the European patent application EP 0662736 A, a slipring is disclosed which includes of a plurality of wires of conductive material which are sliding in a V-groove of a sliding track of further conductive material. Due to the galvanic con-tact between the wires and the sliding track electric current can be transferred between the two parts rotating against each other. Such a slipring may only be used under moderate environmental conditions like in a building. It cannot be used under extreme environmental conditions like low ambient temperatures and high humidity. Under low temperatures, there may be a thin ice film on the sliding tracks which may prevent a contact by the brushes or which may cause at least significant contact noise. Furthermore, under low temperatures the oil, which is required to prevent high wear at the contacting surfaces, is too viscous to provide a sufficient lubrication. The high humidity may lead to a thin ice film with decreasing temperature and it further decreases the electrical isolation, which may lead to leakage currents and arcs on the surfaces.

The international patent application publication WO 2012/028992 discloses problems arising due to high heat developing under rotation of a slipring while transferring high currents. It further discloses a solution to handle high temperatures within the slipring by selecting specific materials.

SUMMARY OF THE INVENTION

The embodiments are based on the object of providing a slipring, which may be used in a broad range of environmental conditions like low temperature and high humidity.

In an embodiment, a heating element is integrated into a slipring module. Preferably, this heating element is at least partially, preferably fully embedded into the slipring module or attached to the surface of the slipring module, preferably attached to the side opposite of the slipring tracks, most preferably attached to the inner surface of the slipring module. The heating element preferably is energized by electric current. Preferably, the heating element is a heating wire, a heating foil, or a heating mesh. It is preferred, if the heating element is arranged close to at least one of the slipring tracks, preferably to a group or most preferably to all slipring tracks. Furthermore, it is preferred, if the heating element is embedded into an isolating body bearing the slipring tracks. The slipring tracks may also be at least partially and preferably fully embedded and/or molded into an insulating body together with the heating element. In an alternative embodiment, the heating element may be integrated into a slipring track. In this embodiment, it is preferred, if the heating element is isolated against the slipring track. In a further embodiment, the slipring track itself may be used for heating. This may be done by driving a high current through the slipring track, which may be delivered by a separate power supply. Heating may be done during operation or before operation. In embodiments, where the heating element is isolated from the slipring track, heating is independent of operation of the slipring. If the slipring track is used for heating, heating is preferably done before operation. Generally, it is advisable to heat the slipring module before starting operation of the slipring at low ambient temperatures. Such a heating brings the slipring module into a preferred operational temperature range and removes the surface humidity. Specifically in applications, where low amounts of electric power and specifically low currents are transferred through a slipring, heating may be maintained during operation. In applications, where the slipring module develops heat during operation either due to high rotational speeds and the friction arising thereof or due to a high current transferred through the slipring or both, it may not be necessary to heat the slipring module during operation. Furthermore heating can be done comparatively quickly as the critical component, the slipring module is heated directly. Heating a slipring module to an operating temperature may take only a few minutes, while placing the slipring in a heated environment like a building would require a few hours for the slipring module to warm up. This is mainly caused by the poor thermal transfer characteristics of the air inside the slipring housing.

Preferably heating of the slipring module is controlled by a temperature and/or humidity controller. Most preferably, this controller switches heating on if the temperature and/or humidity exceed or underrun a threshold value. A major advantage of heating the slipring module is the comparatively low power consumption as a heat is only applied to the portion of the slipring, where it is required.

In a further embodiment there is a temperature sensor embedded into a slipring module.

In another embodiment, there is a humidity sensor, preferably at the surface of a slipring module.

Tests on a large number of sliprings have shown, that the slipring tracks are specifically sensitive to low temperatures and high humidity. This is often caused by the comparatively low creeping distances on the surface of the slipring module. In contrast, thereto the creeping distances on the brush block can easily be in-creased significantly by modifying the layout of the brush block. Furthermore, the thermal capacity of the brush block is significantly higher than the thermal capacity of the brushes. Therefore heating the brush block will often result in heating the brushes. A heated brush block results in better transmission characteristics, lower contact noise, lower friction and higher lifetime. Furthermore, better oil with better lubrication characteristics and better contacting characteristics, but a limited temperature range may be selected.

An inventive method includes the steps of heating a slipring module by letting current flow through a heating element embedded into the slipring module. This method is also suitable for removing humidity from a slipring module.

BRIEF DESCRIPTION OF THE DRAWINGS

In the following, the invention will be described by way of example, without limitation of the general inventive concept, on examples of embodiment and with reference to the drawings.

Figure 1:
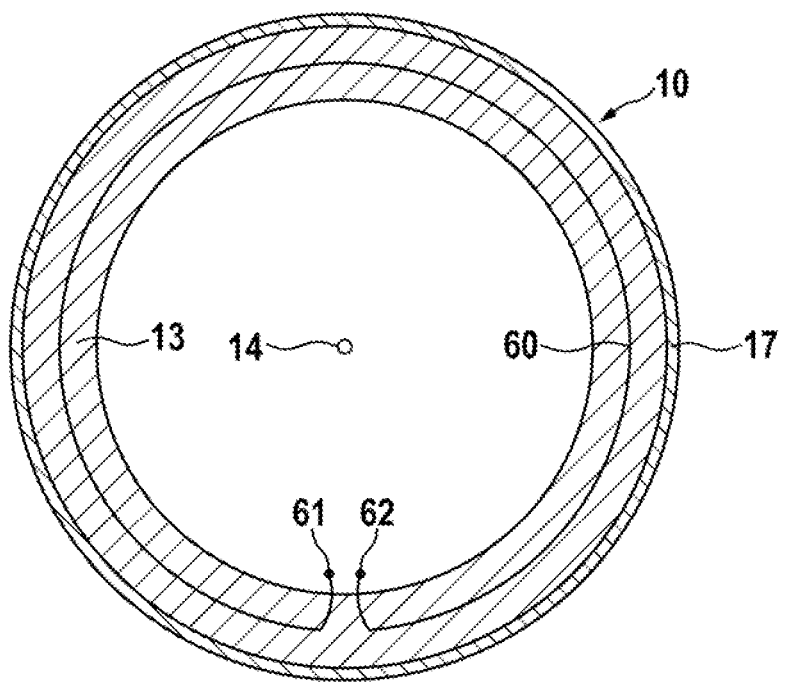
FIG. 1 shows a preferred embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a sectional view of a preferred embodiment is shown. A slipring module 10 has at least one slipring track 17, which is held by insulating body 13, which may rotate around rotating axis 14. Preferably, the slipring track 17 is embedded or molded into insulating body 13. Furthermore, a heating element 60 is integrated into the body 13. Preferably, the heating element has electrical contacts, most preferably a first heating element contact 61 and a second heating element contact 62. Preferably, the heating element 60 is isolated from the slip ring track 17. It is further preferred, if the heating element 60 is arranged in close proximity to the slipring track 17 and most preferably in a good thermal contact to slipring track 17. In a further preferred embodiment, the insulating body 13 includes a thermally conductive material to improve heat transfer from heating element 60 to slipring track 17. The heating element 60 may be a single heating wire or a plurality of wire windings.

Figure 2:
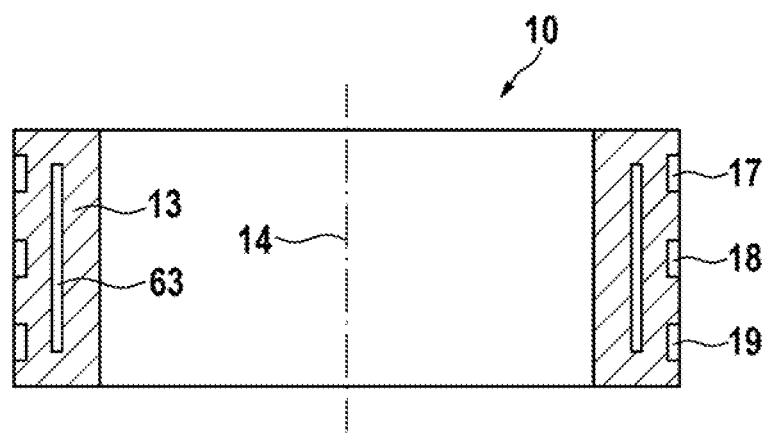
FIG. 2 shows another view of a preferred embodiment.

In FIG. 2, another view of a preferred embodiment is shown. Here the slipring module is cut parallel to the rotation axis 14. Besides first track 17 there is a second track 18 and a third track 19. In this embodiment, the heating element is a heating foil, which is embedded into the isolating body 13 below the three slipring tracks. Instead of the foil also a mesh, e.g. a wire mesh may be used. In an alternative, a number of heating wire windings may be wound with in the isolating body 13.

Figure 3:
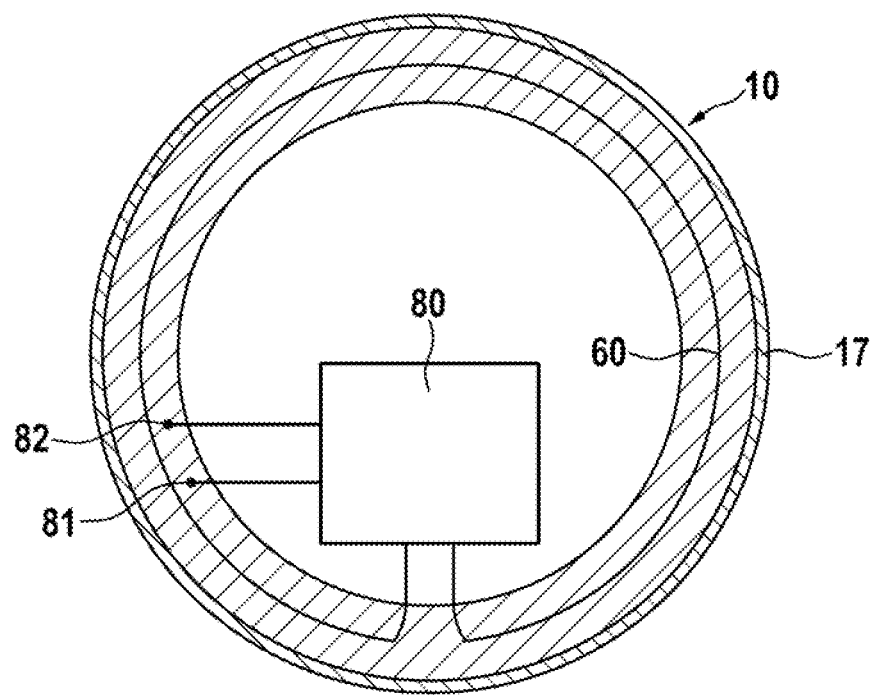
FIG. 3 shows a controller connected to a slipring module.

In FIG. 3, a controller 80 is shown. This controller is connected to heating element 60 to control the temperature of the heating element and/or slipring track 17. The controller feeds a current into heating element 60 to generate heat. This current may be controlled by using at least one sensor or by an external control signal. There may be a temperature sensor 81 to provide information about the temperature of the slipring module and/or the slipring tracks to the controller 80. Preferably, the temperature sensor is embedded into the insulating body 13 of the slipring module. It may also be thermally connected to at least one slipring track to provide a precise temperature measurement. Furthermore, there may be a plurality of temperature sensors to provide temperature information of different locations. There may also be humidity sensor 82 providing humidity information to the controller 80. Preferably, this humidity sensor is at the surface of slipring module 10. Either the humidity sensor may be a standard capacitive humidity sensor or it may be a conductivity sensor measuring the conductivity on the surface of slipring module 10. For measuring conductivity, there may be some electrodes within this surface of slipring module 10. In an alternative embodiment the conductivity and/or isolation between slipring tracks, most preferably between neighboring slipring tracks, may be measured. Based on the information from the sensors the controller may control the current through the heating element either to or to quickly heat up the module to remove humidity. After the humidity has been removed, the temperature may be reduced.

Figure 4:
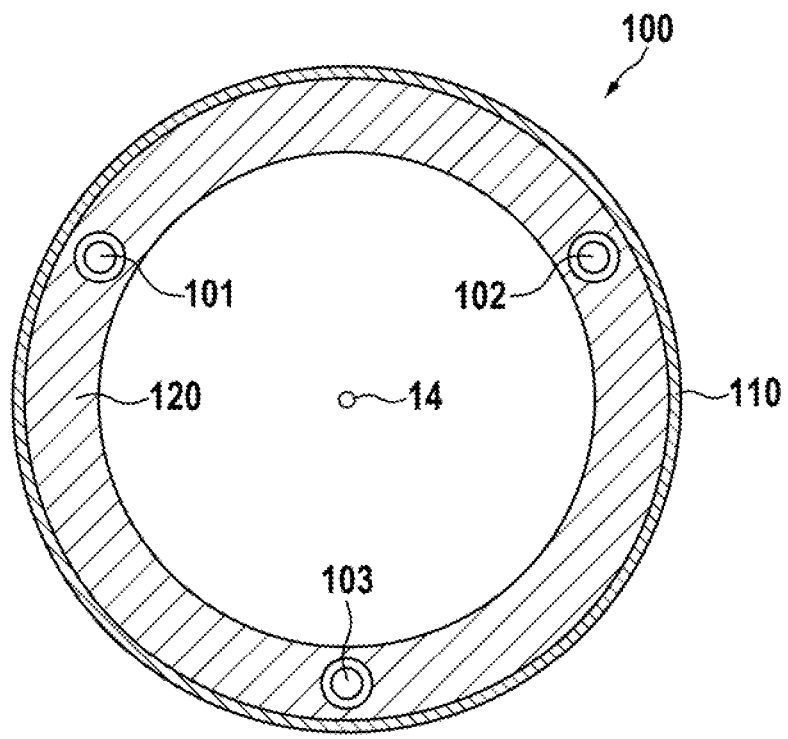
FIG. 4 shows a further embodiment.

FIG. 4 shows a further embodiment in a top view. A first slipring module 100 comprises at least a first sliding track 110. The sliding tracks are held by an isolating body 120. At least one heating rod 101, 102, 103, is located within a plurality of holes in the isolating body 120. Preferably, the heating rods are spaced equally. Preferably, there are one, two, three or four heating rods. Such a heating rod may comprise a heater like an electric resistor. It may also comprise a heat pipe or a part thereof. There may also be a heat pipe within at least one hole in the isolating body 120. Preferably, the heat pipe is connected to a heat source, which may be an electric heater or electrical resistor.

Figure 5:
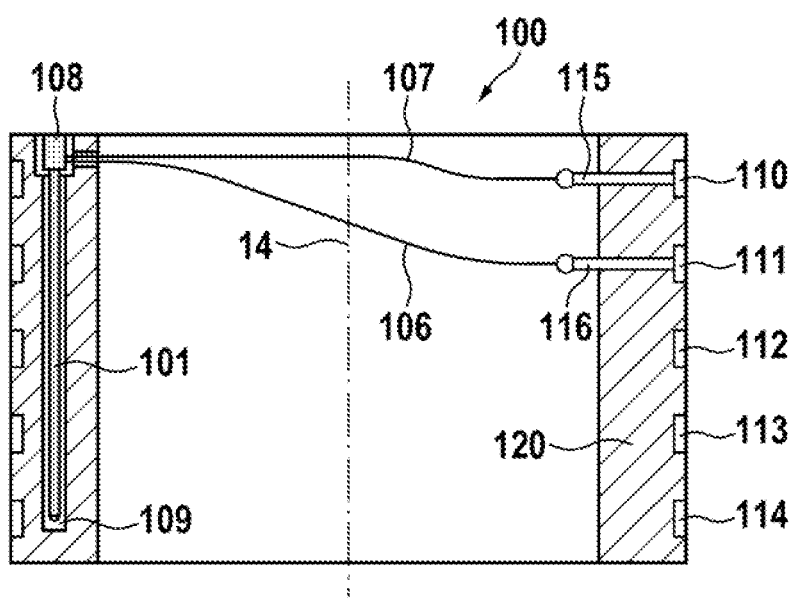
FIG. 5 shows a further embodiment in a sectional view.

FIG. 5 shows a further embodiment of the previous figure in a sectional view. A blind hole in 109 may be provided within the isolating body 120. It may hold a heating rod 101. Preferably, the heating rod comprises an electrical resistor for generating heat by electric current. It may also comprise a heat pipe for transferring heat to the slipring module. There may be a further heat source connected to such a heat pipe for heating up the heat pipe. The heating rod 101 may have a connector housing 108 to connect cables 106, 107. These cables may further be connected via connecting posts 115, 116 to at least two slipring tracks 110, 111 for supply of electrical current. There may be any number of further slipring tracks 112, 113 and 114.

Figure 6:
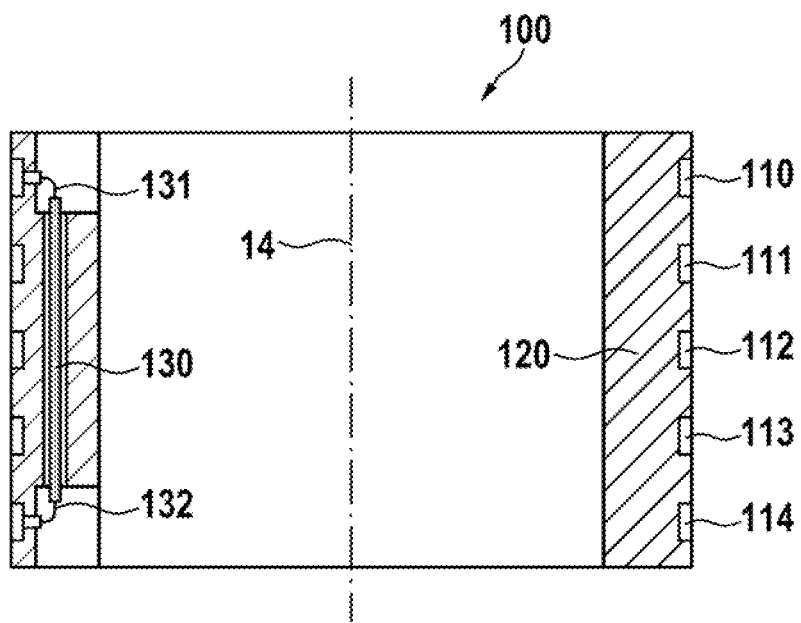
FIG. 6 shows another embodiment in a sectional view.

FIG. 6 shows another embodiment in a sectional view. There may be at least one through hole 130 within the isolating body 120. Within the through hole 130, there may be a heating rod one for serial as described before, which preferably is connected by cables 131, 132 to slipring tracks 110 and 114. There may be any of the slipring tracks selected for electrical connection and providing electric power to the heating rod.

Figure 7:
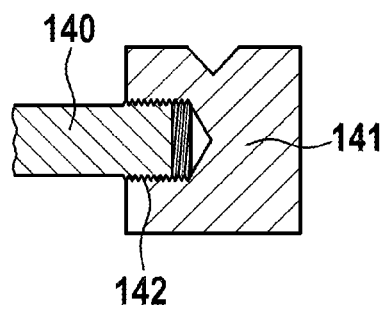
FIG. 7 shows a direct track heating.

FIG. 7 shows a direct track heating. Here a heating rod, comprising an electrical resistor and/or a heat pipe may be directly connected to a slipring track 141. Preferably, it is connected by a thread 142. This allows for a solid mechanical and heat conducting connection.

Figure 8:
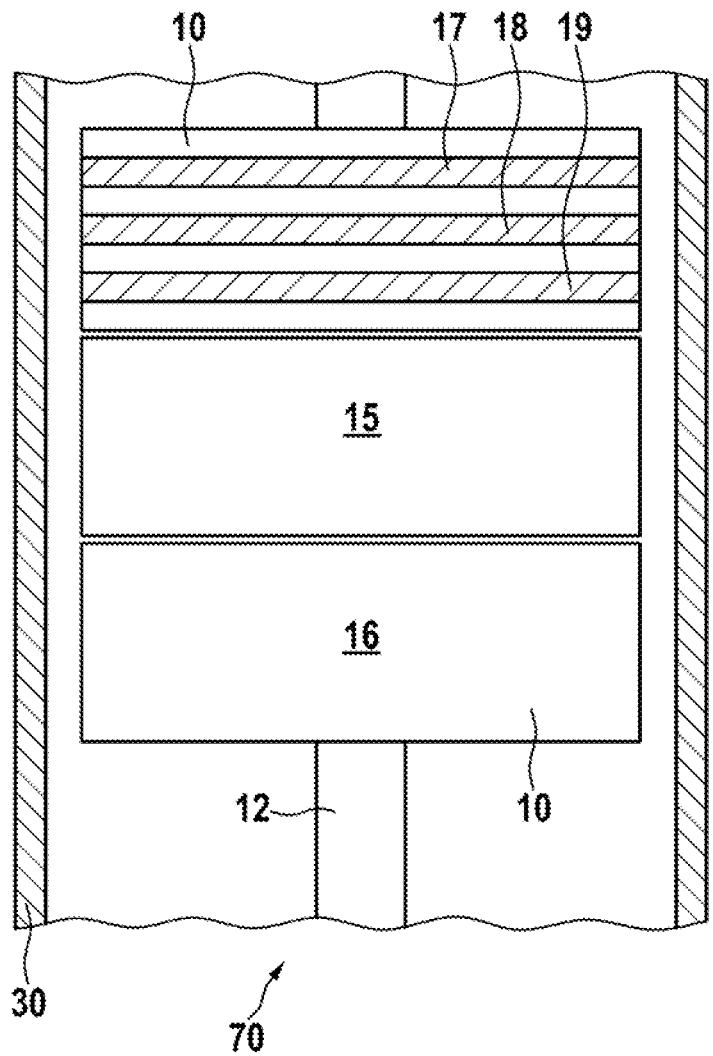
FIG. 8 shows a side view of a general slipring assembly.

In FIG. 8, a side view of a general slipring assembly is shown. Exemplarily there are three slipring modules 10, 15 and 16 mounted to a shaft 12.

Figure 9:
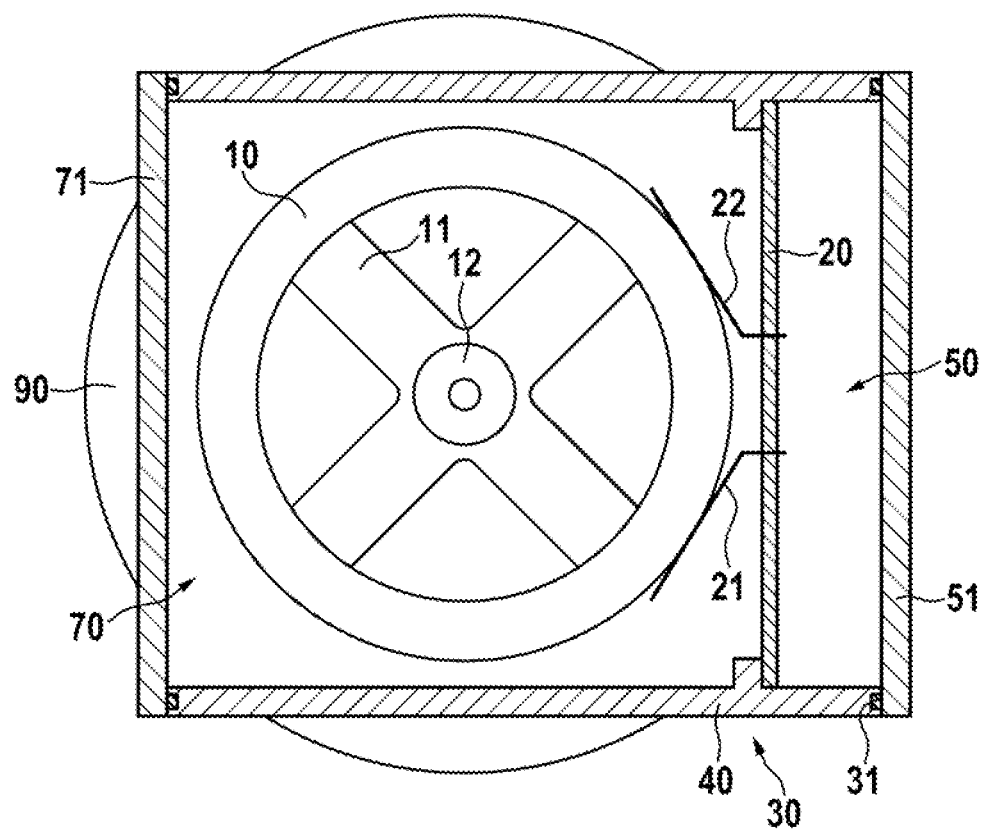
FIG. 9 shows a top view of a general slipring assembly.

In FIG. 9, a top view of the general slipring assembly is shown. A slipring module 10 is held by a module support 11 and mounted to a shaft 12. There is a plurality of contact brushes like first contact brush 21 and second contact brush 22, which are held and electrically contacted by brush holder 20. The slipring assembly is enclosed by a slipring housing 30 having a plurality of sidewalls 40. There may be a connecting space 50 for electrically connecting the slipring brushes, which may have a first cover 51. Furthermore, the inner space 70 of the housing has a second cover 71.

Figure 10:
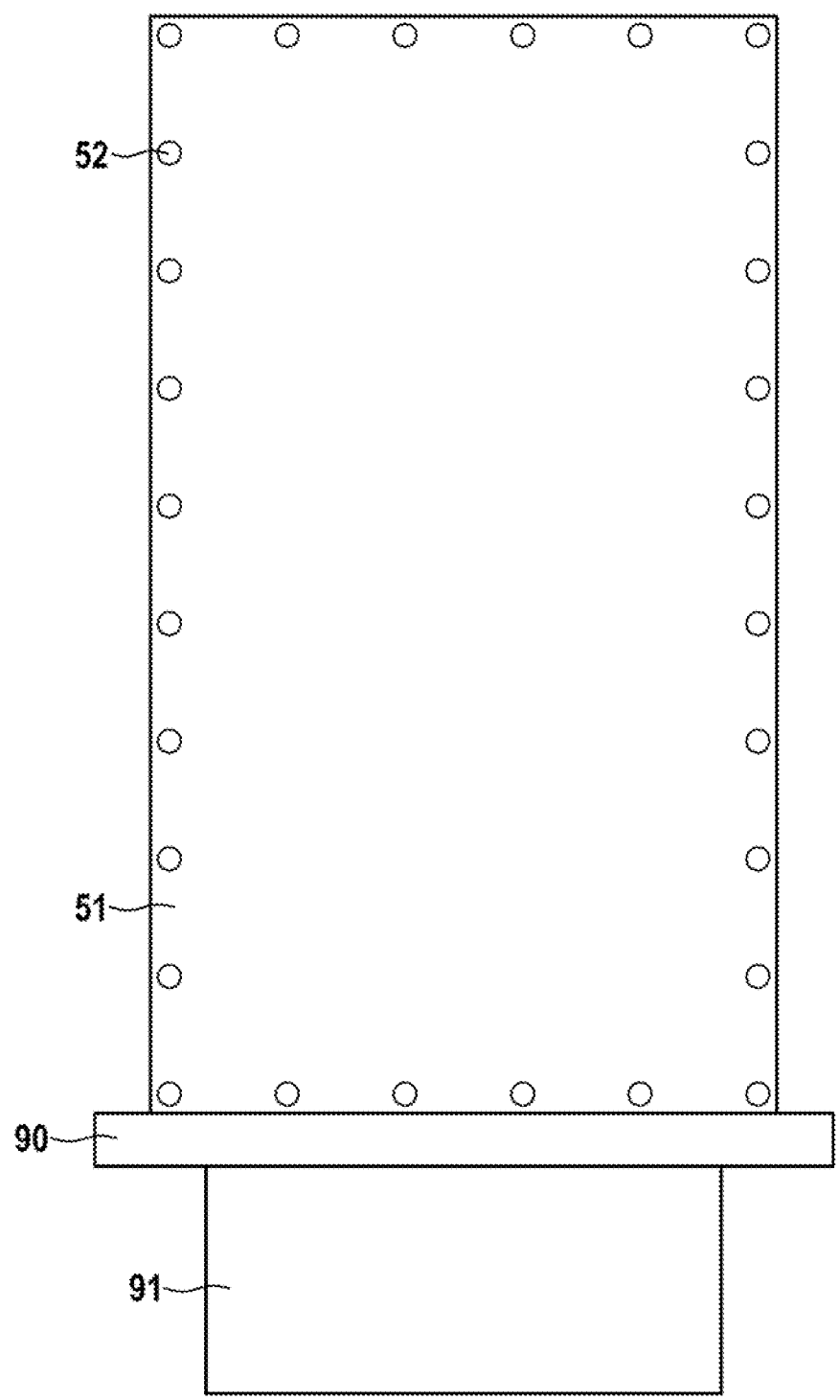
FIG. 10 shows a slipring housing.

In FIG. 10, a slipring housing is shown. The first cover 51 may be locked by a plurality of screws 52. There may further be a housing of bearing 90 to enclose a bearing, which allows rotation between the modules and the brushes and a module connection case 91 for electrically connecting and contacting the module. This case may also contain the controller 80.

It will be appreciated to those skilled in the art having the benefit of this disclosure that this invention is believed to provide sliprings, used for the transmission of electrical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 slipring module
11 module support
12 shaft
13 isolating body
14 rotation axis
15 second slipring module
16 third slipring module
17 first track
18 second track
19 third track
20 brush holder
21 first brush
22 second brush
30 slipring housing
31 ceiling
40 sidewall
50 connecting space
51 first cover
52 screws
60 heating element
61 first heating element contact
62 second heating element contact
63 heating foil
70 inner space of housing
71 second cover
80 controller
81 temperature sensor
82 humidity sensor
90 housing of bearing
91 module connection case
100 third slipring module
101 first heating rod
102 second heating rod
103 third heating rod
106, 107 cables
108 connector housing
109 hole
110 first track
111 second track
112 third track
113 second track
114 third track
115,116 connecting posts
120 isolating body
130 through hole
131, 132 cables
140 heating rod
141 slipring track
142 thread

The invention claimed is:

1. A slipring module comprising:
an isolating body, wherein the isolating body is configured to rotate during operation about an axis of the slipring module and relative to an electrical contact;
at least one slipring track coupled directly to and around the isolating body, the at least one slipring track being electrically conductive; and
at least one heating element configured to generate heat and to increase a temperature of the at least one slipring track for bringing the at least one slipring track to an operation temperature and for removing humidity from the at least one slipring track,
wherein the at least one heating element is embedded into the isolating body under the at least one slipring track, and
wherein the at least one slipring track is electrically isolated from the at least one heating element.

2. The slipring module according to claim 1, wherein the at least one heating element includes at least one of: a heating wire, foil or mesh, a heating rod, or a heat pipe coupled to a heat source, and wherein the electrical contact comprises a brush.

3. The slipring module according to claim 1, wherein the at least one heating element is in close thermal or physical contact with at least one of the at least one slipring track.

4. The slipring module according to claim 1, further comprising a heating controller configured to deliver a current through the at least one heating element.

5. The slipring module according to claim 4, wherein the heating controller is configured to control the temperature of the slipring module or of the at least one slipring track.

6. The slipring module according to claim 4, further comprising a temperature sensor configured to measure the temperature of the slipring module or at least one of the at least one slipring track, and to forward the temperature to the heating controller.

7. The slipring module according to claim 4, further comprising a humidity sensor configured to measure the humidity of the slipring module or at least one of the at least one slipring track, and to forward the humidity value to the heating controller.

8. The slipring module according to claim 7, wherein the humidity sensor is attached to a surface of the isolating body.

9. A slipring assembly comprising:
at least one slipring module comprising:
an isolating body;
at least one slipring track coupled directly to and around the isolating body, the at least one slipring track being electrically conductive; and
at least one heating element configured to generate heat and to increase a temperature of the at least one slipring track for bringing the at least one slipring track to an operation temperature and for removing humidity from the at least one slipring track,
wherein the at least one heating element is embedded into the isolating body under the slipring track,
wherein the at least one slipring track is electrically isolated from the at least one heating element, wherein the least one slipring module is coupled to a rotatable shaft and configured to rotate relative to at least one brush; and the at least one brush which is in electrical contact with at least one slipring track, wherein the brush is coupled to a housing.

10. The slipring assembly according to claim 9, further comprising the housing configured to enclose the at least one slipring module and the at least one slipring brush.

11. A slipring module comprising:

an isolating body;

three or more slipring tracks coupled directly to and around the isolating body, the three or more slipring tracks being electrically conductive; and at least one heating element configured to generate heat and to increase a temperature of the three or more slipring tracks for bringing the three or more slipring tracks to an operation temperature and for removing humidity from the three or more slipring tracks, wherein the at least one heating element is embedded into the isolating body, wherein the at least one of the three or more slipring tracks is electrically isolated from the at least one heating element, and wherein the slipring module is configured to transfer electrical power or signals between a rotating component and a stationary component of a machine.

12. The slipring module according to claim 11, wherein the at least one heating element includes at least one of: a heating wire, foil or mesh, a heating rod, or a heat pipe coupled to a heat source.

13. The slipring module according to claim 11, wherein the at least one heating element is in close thermal or physical contact with at least one of the three or more slipring tracks.

14. The slipring module according to claim 11, further comprising a heating controller configured to deliver a current through the at least one heating element.

15. The slipring module according to claim 14, wherein the heating controller is configured to control the temperature of the slipring module or of the three or more slipring tracks.

16. The slipring module according to claim 14, further comprising a temperature sensor configured to measure the temperature of the slipring module or at least one of the three or more slipring tracks, and to forward the temperature to the heating controller.

17. The slipring module according to claim 14, further comprising a humidity sensor configured to measure the humidity of the slipring module or at least one of the three or more slipring tracks, and to forward the humidity value to the heating controller.

18. The slipring module according to claim 17, wherein the humidity sensor is attached to a surface of the isolating body.

19. The slipring module according to claim 11, further comprising at least one brush which is in electrical contact with at least one slipring track.

20. The slipring module according to claim 19, wherein a housing is configured to enclose the slipring module and the at least one brush.

* * * * *